A. ZIPPLIES.
ELECTRIC MOTOR METER.
APPLICATION FILED JUNE 28, 1909.
968,631.
Patented Aug. 30, 1910.
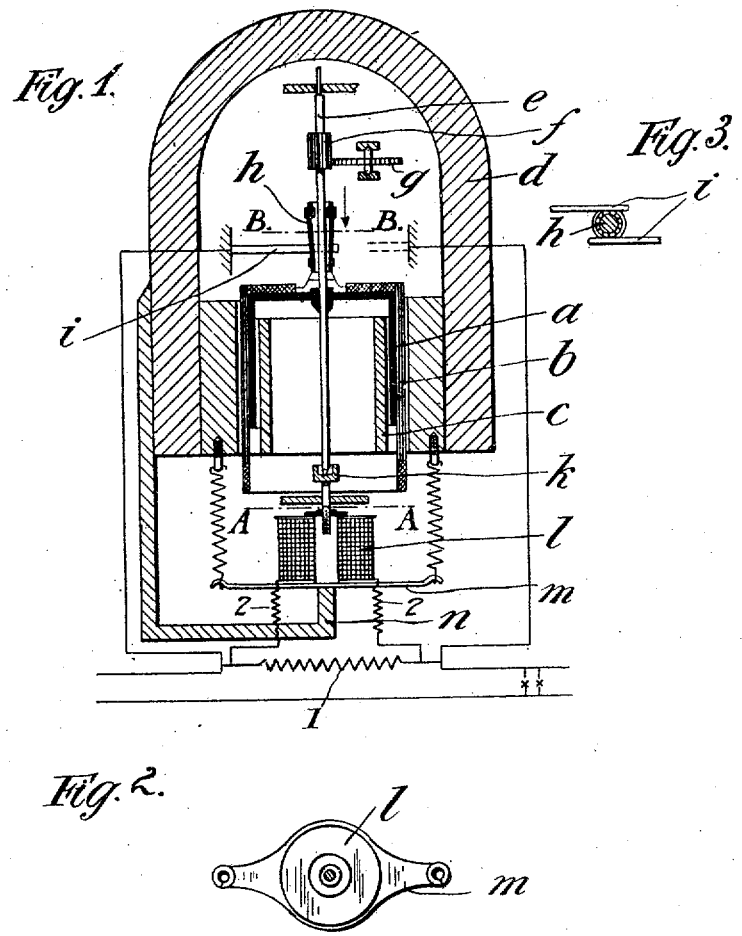
Inventor:
Arthur Zipplies

UNITED STATES PATENT OFFICE.

ARTHUR ZIPPLIES, OF MOSBACH, GERMANY, ASSIGNOR TO AKTIENGESELLSCHAFT KÖRTING'S ELEKTRICITÄTSWERKE, OF BERLIN, GERMANY.

ELECTRIC MOTOR-METER.

968,631.  Specification of Letters Patent.  Patented Aug. 30, 1910.

Application filed June 28, 1909. Serial No. 504,900.

*To all whom it may concern:*

Be it known that I, ARTHUR ZIPPLIES, a subject of the Emperor of Germany, residing at Mosbach, Baden, in the Empire of Germany, engineer, have invented certain new and useful Improvements in or Relating to Electric Motor-Meters, of which the following is a specification.

This invention has for its object improvements in or relating to electric motor meters in which an axial displacement of the armature and of the collector is possible relatively to the brushes or vice versa. Experience has shown that if motor meters with commutator are subjected to heavy loads, the brushes are often thrown off whereby in consequence of the spark formation thus produced the faces of the brushes and of the collector are subjected to strong wear. This is particularly the case if the armature or the collector does not run with circular precision, as well as in high speed meters, as for instance in the case of ampere-hour meters. Though, viewed from this standpoint, it appears necessary to exert a high pressure on the brushes, yet in view of the advisability of decreasing, as much as possible, the frictional resistances when working with a small load and of insuring a light start, the brush pressure should be as slight as possible.

The device hereinafter described has therefore for its particular object to use the electric current for moving the armature or collector and to effect the variation of the brush pressure in a mechanical manner. In general, this regulation of the pressure of the brushes is effected by spreading apart more or less the brushes acting on opposite sides against the collector, thereby increasing more or less the tensional force of their springs.

In practice, the invention may be carried out in various ways and several constructional forms thereof are shown by way of example, in the accompanying drawing in which:

Figure 1 is a sectional view of the meter. Fig. 2 shows the plate or disk to which the controlling electro-magnet is secured, and Fig. 3 is a horizontal cross-section taken on the line B—B of Fig. 1.

The meter consists as usual of a magnet $d$ between the poles of which rotates the armature $a\ b\ c$. The rotary movement of the armature is transmitted in a known manner by a shaft $e$ and a gear $f\ g$ to a counting mechanism. The relative displacement of the brushes $i$ with regard to the collector $h$ of the armature may be effected automatically by an electromagnetic regulating device. The regulating device consists of a solenoid $l$ which is secured on a plate $m$ and suspended by springs from the magnet. The solenoid carries the step bearing $k$ of the armature shaft $e$. The polarized core $n$ has its one pole connected to the magnet. According to the strength of the current traversing the solenoid the latter approaches the core $n$ in a known manner, more or less, the core entering the opening of the solenoid. If the solenoid descends the armature $a\ b\ c$ descends likewise and the position of the brushes on the collector $h$ is changed accordingly. This arrangement *per se* is not new. The novel feature, however, consists in varying simultaneously with the variation of the position of the brushes, the degree of pressure of the brushes against the circumference of the collector. To this end, according to Fig. 1, the collector has the shape of a cone so that during the descent of the armature the brushes wipe against parts of the collector of a diameter which is different or greater than that of the place previously wiped by the brushes. The brushes are thus driven apart to an increased extent, that is to say are spread apart whereby the pressure of the springs acting against the brushes is correspondingly increased. The result hereof is an application of the brushes at increased pressure. The springs need not be plate springs but may have the form of torsional springs so arranged on the revolving axis of the brushes as to press the latter against the collector. Fig. 3 illustrates a cross-section of this arrangement the springs being omitted, for it is clear that the brushes may in themselves receive a higher resiliency upon being moved apart to a greater extent.

In the operation of the device, current is supplied to the armature from the main line, said armature being connected in series with the main line, as shown. The wires of one side of the main line are tapped by a coil $l$, having a greater resistance than the armature. The solenoid $l$ is connected in shunt with the resistance 1, by means of the proper resistances 2. It is to be understood that a portion of the current will pass through the resistances 2 to energize the solenoid $l$. When the load on the line increases, the amount of current passing through the line is increased, which increased current passes through the armature. This causes the armature to increase in rotation, whereby the collector $h$, by centrifugal force, would have a tendency to cause the brushes $i$ to move away from the same. It is now very necessary to have the brushes press harder against the collector $h$, because of the increased current. When the current is increased in the armature, it is increased in the solenoid $l$, whereby the same is moved downwardly, carrying with it the member $k$. The armature and shaft $e$, owing to gravity follow the member $k$, whereby the collector $h$ is moved downwardly. The collector is frustoconical and increases in width upwardly, whereby the brushes $i$ are forced apart and made to press harder against said collector. From the above it is obvious, that when the current is increased, and the rotation of the armature increased, the pressure of the brushes against the collector is increased in a proper amount.

I claim:

1. In a device of the character described, a magnet, an armature to rotate within the field of the same, a shaft connected with said armature, electrically operated means to effect the longitudinal movement of said shaft, a collector increasing in width in one direction connected with said shaft, and stationary brushes to engage said collector.

2. In a device of the character described, a magnet, an armature to rotate within the field of the same, a shaft to support said armature, means to move said shaft longitudinally, a frustoconical collector carried by said shaft, and brushes having their outer ends rigidly supported and their inner ends disposed to engage the collector, whereby the pressure of said brushes upon the collector is increased when said shaft is moved longitudinally.

3. In a device of the character described, the combination with an armature shaft, a frustoconical collector connected therewith, brushes to engage said collector, and means to effect the longitudinal movement of said shaft.

In testimony whereof I have signed my name to this specification in the presence of two subscribing witnesses.

ARTHUR ZIPPLIES.

Witnesses:
 WALTER MUND,
 A. T. MILTON.